United States Patent
Ootsuka et al.

(10) Patent No.: US 6,719,345 B2
(45) Date of Patent: Apr. 13, 2004

(54) STRUCTURE FOR EXTENDING BED OF PICKUP TRUCK

(75) Inventors: Tomonori Ootsuka, Tokyo (JP); Tsutomu Iwase, Tokyo (JP); Masataro Takahashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/325,585

(22) Filed: Dec. 23, 2002

(65) Prior Publication Data

US 2003/0116986 A1 Jun. 26, 2003

(30) Foreign Application Priority Data

Dec. 26, 2001 (JP) ........................................ 2001-393705

(51) Int. Cl.[7] .................................................. B60P 3/34
(52) U.S. Cl. ................................ 296/26.08; 296/26.09; 296/26.11; 296/26.1
(58) Field of Search .......................... 296/26.08, 26.09, 296/26.11, 26.1, 61

(56) References Cited

U.S. PATENT DOCUMENTS

| | | | | |
|---|---|---|---|---|
| 5,868,449 A | * | 2/1999 | Hitchcock | 296/26.1 |
| 5,924,753 A | * | 7/1999 | DiBassie | 296/26.09 |
| 5,997,066 A | * | 12/1999 | Scott | 296/26.08 |
| 6,007,127 A | * | 12/1999 | Garofalo | 296/26.11 |
| 6,019,410 A | * | 2/2000 | Trostle et al. | 296/26.11 |
| 6,042,167 A | * | 3/2000 | Pierce et al. | 296/26.08 |
| 6,045,172 A | * | 4/2000 | Thomas et al. | 296/26.1 |
| 6,082,801 A | * | 7/2000 | Owen et al. | 296/26.08 |
| 6,120,076 A | * | 9/2000 | Adsit et al. | 296/26.11 |
| 6,142,548 A | * | 11/2000 | Kuhn et al. | 296/26.1 |
| 6,149,219 A | * | 11/2000 | Schambre et al. | 296/26.11 |
| 6,155,622 A | * | 12/2000 | Reed | 296/26.08 |
| 6,155,623 A | * | 12/2000 | Lane | 296/26.09 |
| 6,158,797 A | * | 12/2000 | Bauer | 296/61 |
| 6,179,360 B1 | * | 1/2001 | Davian | 296/26.08 |
| 6,186,575 B1 | * | 2/2001 | Fisher et al. | 296/26.09 |
| 6,193,294 B1 | * | 2/2001 | Disner et al. | 296/26.11 |
| 6,210,087 B1 | * | 4/2001 | Bacon | 296/26.11 |
| 6,227,593 B1 | * | 5/2001 | De Valcourt | 296/26.08 |
| 6,257,637 B1 | * | 7/2001 | Reed | 296/26.08 |
| 6,283,525 B1 | * | 9/2001 | Morse | 296/26.11 |
| 6,322,125 B2 | * | 11/2001 | Bauer | 296/26.1 |
| 6,340,190 B1 | * | 1/2002 | Rosebrugh et al. | 296/26.11 |
| 6,425,618 B1 | * | 7/2002 | Garland et al. | 296/26.11 |
| 6,435,588 B1 | * | 8/2002 | Bauer | 296/61 |

* cited by examiner

*Primary Examiner*—Kiran Patel
(74) *Attorney, Agent, or Firm*—Smith, Gambrell & Russell, LLP

(57) ABSTRACT

The present invention provides a structure 10 for extending a bed of a pickup truck; the structure being rotatably supported on a rear portion 1B of the bed of the pickup truck having a tailgate 4 capable of bringing down in an approximate level with a rear end of the bed 1; and the structure being provided on a first upper side of the tailgate 7 to be housed in the bed when the tailgate is rotated in a forward direction of the truck; wherein fixing means 20 is provided for fixing the structure provided on a second upper side of the floor onto the bed. Hence, if the structure is off the supporting bracket 16 when the structure is housed in the bed, the fixing means of the invention can prevent the structure from separating from the body not to have a secondary influence on surroundings by the structure 10.

25 Claims, 10 Drawing Sheets

FIG. 10 --PRIOR ART--

STRUCTURE FOR EXTENDING BED OF PICKUP TRUCK

BACKGROUND OF THE INVENTION

1. Field of the Invention

The present invention relates to a structure for extending a bed of a pickup truck, which extends the bed to rearward of the truck and surrounds both sides in a width direction of the tailgate and the rear side of the tailgate, on an upper side of the tailgate lowered in an approximate level with a rear direction of the truck.

2. Description of the Related Art Including Information Disclosed Under 37 CFR 1.97 and 1.98

FIG. 10 is a perspective view for explaining a prior art, in which a pickup truck 100 is seen from upper rear side. In FIG. 10, a pickup truck 100 provided with a bed 103 having no roof which is monolithically formed with sidewalls 102 provided at the rear portion of a cab is shown.

A structure 110 for extending a bed is disposed on the upper side of a tailgate 104 lowered horizontally, and extends the bed rearwardly. The structure 110 is provided with a pair of sidewall portions 111 successively existing backward from the rear end of a sidewall 102 along both sides of the tailgate 104, and a front wall portion 112 blockading an area between the rear ends of both sidewall portions 111 extending along the rear end of the tailgate 104. The sidewall portion or front wall portion generally comprises plural stick-shaped members disposed at intervals, and therefore corresponds to a virtual wall.

A rotating axis 113 for supporting rotatably the structure 110 on a sidewall inner panel 102a located on rear portion of the sidewall 102 is provided on an outer side of the sidewall portion 111. Thus, the structure 110 can be rotated forward on the rotating axis 113, and the structure 110 can be housed in the bed 103 by closing the tailgate 104 with keeping the structure 110 on the floor 105 of the bed.

This structure 110 for extending the bed 103 is provided with a fixing belt 120 for fixing the structure 110 onto the tailgate 104 lowered horizontally. The fixing belt 120 is attached to each of both the sidewall portions 111, and provided with a metal fitting (hook) 121 capable of engaging the tailgate 104 attached onto its end.

FIG. 11 is a perspective view for explaining the condition that the bed 103 extends rearwardly by the use of the structure 110 for extending the bed 103. FIG. 12 is a perspective view for explaining the condition that the structure 110 is housed. The structure 110 having the above-mentioned construction is, as shown in FIG. 11, fixed onto the tailgate 104 by engaging the metal fitting 121 with the tailgate 104, and hence shake of the structure 110 generated during running of a truck can be suppressed.

On the other hand, when the structure 110 is rotated forward on the rotating axis 113 and disposed on the upper side of the floor 105 of the bed as shown in FIG. 12 to be housed by closing the tailgate 104, shake of the structure 110 is suppressed by bringing a tailgate inner panel 104a in contact with the end 111a of the sidewall portion 111 of the structure 110.

SUMMARY OF THE INVENTION

The structure 110 for extending the bed 103 is supported on the bed 103 only by the two rotating axes 113 disposed on left and right sides of the structure housed in the bed 103, as shown in FIG. 12. Hence, in case impact load is applied to the body of a truck to damage or deform the rotating axis 113 or a part supporting it, the structure is off the part supporting rotatably it to be thrown out from the bed 103, which occasionally has a secondary influence on surroundings.

Hence, the object of the present invention is to provide the structure for extending a bed which is prevented from separating from the body when the structure housed in the bed is off the part supporting rotatably it.

The present invention to attain the object is provided by a structure for extending a bed of a pickup truck;

the structure (assembly) being rotatably supported on a rear portion of the bed of the pickup truck, the pickup truck having the bed (provided at the rear of a cab) including a floor, a pair of side walls extending longitudinally along both edge sides of the floor, and a tailgate configured to be lowered in succession to the rear end of the floor and approximate level with the rear end by tilting the tailgate;

the structure being provided on an upper side (hereafter referred to as a first upper side) of the tailgate to extend the bed rearwardly when the tailgate is lowered by rotation in a rear direction of the truck; and the structure being provided on an upper side (hereafter referred to as a second upper side) of the floor to be housed in the bed when the tailgate is rotated in a forward direction of the truck;

wherein fixing means is provided for fixing the structure arranged on the second upper side of the floor onto the bed is provided.

According to the above-mentioned invention, the structure for extending a bed is fixed on the bed by fixing means, and hence if impact load is applied to the body of a truck whereby the structure is off a part supporting it, the structure can be fixed onto the bed so as to have no secondary influence on surroundings.

The present invention to attain the object is also provided by a structure for extending a bed of a pickup truck;

the structure (assembly) being rotatably supported on a rear portion of the bed of the pickup truck, the pickup truck having the bed (provided at the rear of a cab) including a floor, a pair of side walls extending longitudinally along both edge sides of the floor, and a tailgate configured to be lowered in succession to the rear end of the floor and approximate level with the rear end by tilting the tailgate;

the structure extending from the rear end of the sidewalls to rearward of the body along both sides of the tailgate and extending in the width direction of the truck along the rear end of the tailgate whereby the floor of the bed extends rearwardly to convert the first upper side of the tailgate to a part of the floor, when the tailgate is lowered by rotation in a rear direction of the truck; and the structure being provided on a second upper side of the floor to be housed in the bed when the tailgate is rotated in a forward direction of the truck;

wherein fixing means is provided for fixing the structure arranged on the second upper side of the floor.

The above-mentioned invention is a further restricted embodiment of the first invention. According to the invention, the structure for extending a bed is fixed on the bed by a fixing means, and hence if impact load is applied to the body of a truck whereby the structure is off a part supporting it, the structure can be fixed onto the bed so as to have no secondary influence on surroundings.

In the structure for extending a bed, it is preferred that the fixing means permits fixing the structure arranged on the lowered tailgate onto the tailgate.

According to the above embodiment, by using the fixing means for fixing the structure on the bed when the structure is housed in the bed, the structure can be fixed onto the tailgate when the bed extends. Hence, the fixing means can be used when the structure is housed as well as extended, and therefore the fixing means is not needed to be provided in each case of housing and extending whereby the number of members can be reduced and the construction of the structure can be rendered simple to reduce coat.

In any of the structures for extending a bed, it is preferred that the fixing means has a fixing belt whose end is attached to the structure and whose length is adjustable, and a hook provided on the end of the fixing belt and capable of hooking on an anchor (part to be hooked) attached to the bed.

According to the above embodiment, the structure is rotated and arranged on the floor of the bed, and the hook of the fixing belt is engaged with the anchor before a length of the fixing belt is adjusted, whereby the structure can be fixed onto the bed.

In the above embodiment, it is preferred that;
the tailgate has a latch configured to be hooked on the rear ends of the sidewalls when the tailgate is rotated in a forward direction to be raised up, and
the fixing means is provided on the end of the fixing belt and provided with an engagement part capable of engaging the latch of the lowered tailgate,
the structure being fixed to the tailgate by engaging the engagement part with the latch of the lowered tailgate.

According to the above embodiment, the structure is arranged on the tailgate lowered by rotation, and the engagement part of the fixing belt is engaged with the latch that is not used on the extending of the bed, and then a length of the fixing belt is adjusted, whereby the structure can be fixed onto the bed. Hence, the fixing belt can be used when the structure is housed as well as extended whereby the number of members can be reduced and the construction of the structure can be made simple to reduce cost.

In the embodiment described above, it is preferred that the structure is provided with plural U-shaped members (i.e., stick-shaped members bent in the form of "U") along a periphery of the first upper side of the lowered tailgate and combining members connecting U-shaped members to one another at vertical parallel intervals, and
the fixing belt is supported movably in axial direction of the plural stick-shaped members by any of the plural stick-shaped members.

According to the above embodiment, the fixing belt is supported movably in axial direction of the plural stick-shaped members by any of the plural stick-shaped members constituting the structure, and hence the belt can be moved to a position corresponding to the anchor or the latch whereby the structure can be firmly fixed onto the bed or tailgate. Hence, the structure can be firmly fixed onto the bed so as to have no secondary influence on surroundings if the structure is off the part for supporting it on the rear portion of the bed.

In the above embodiment, it is preferred that the fixing belt is attached removably to the stick-shaped members.

According to this embodiment, the fixing belt can be removed from the structure, and therefore the removed fixing belt can be used as, for example, an ordinary cargo belt for fixing cargo.

In any of two embodiments described just above, it is preferred that the stick-shaped members have control means controlling movement of the fixing belt in a defined range.

According to this embodiment, movement of the fixing belt against the structure is restricted to a defined range, and hence when length of the fixing belt is adjusted after the hook is hooked on the anchor or an engagement part is engaged to the latch, a range for adjusting the fixing belt can be reduced. Accordingly, work for fixing the structure can be rapidly and easily performed to improve convenience for use.

DETAILED DESCRIPTION OF THE INVENTION

The embodiments of the invention are explained below.

Figure 1:
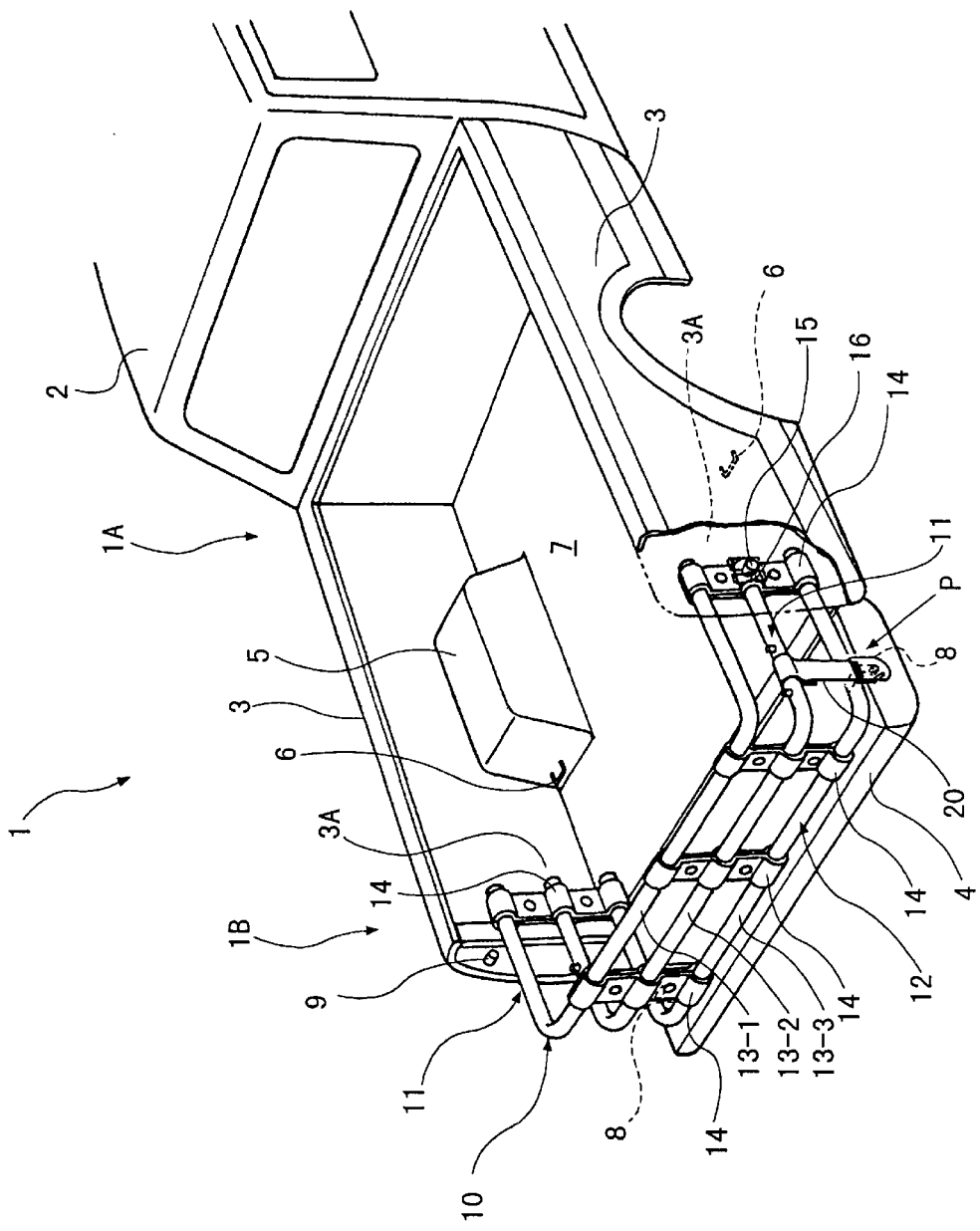
FIG. 1 is a schematic view showing an embodiment according to the present invention.

FIG. 1 is a schematic view showing an embodiment according to the invention. In FIG. 1, the reference number 1 represents a bed of a pickup truck. The bed 1 is provided with a pair of opposite sidewalls 3, which are monolithically formed, and a tailgate 4 blockading the rear portion of the sidewalls 3. The sidewall 3 has a receiving fitting (anchor) 6 on the rear portion of a wheelhouse 5.

The tailgate 4 is rotated in the rear direction of the truck body on a lower end of the tailgate 4 hinge-bonded to the rear end of the floor 7 of the bed to be lowered, whereby the tailgate 4 can be arranged in level with the floor 7. Further, when the tailgate 4 is closed, a latch 8 provided on each of both sides of the tailgate 4 is engaged with a stick-shaped striker 9 protruded from the rear end of the sidewall 3 to permit keeping the closed condition.

The structure 10 for extending the bed 1 to rearward of the body is arranged on the first upper side of tailgate 4 lowered horizontally and attached to the bed 1 having the above-mentioned construction. The structure is composed of three stick-shaped members 13-1, 13-2, 13-3 bent in the form of "U" that are combined in parallel one another at a defined interval using plural combining members 14. When the structure is arranged on the first upper side of the lowered tailgate 4, both of a pair of sidewall portions 11 extending continuously along both sides of the tailgate 4 from the rear end of the sidewalls 3 to rearward of the body and a front wall 12 extending in the width direction of the body along the rear end of the lowered tailgate 4 to combine both sidewall portions 11 to each other extend the bed 1 to rearward of the body.

Figure 2:
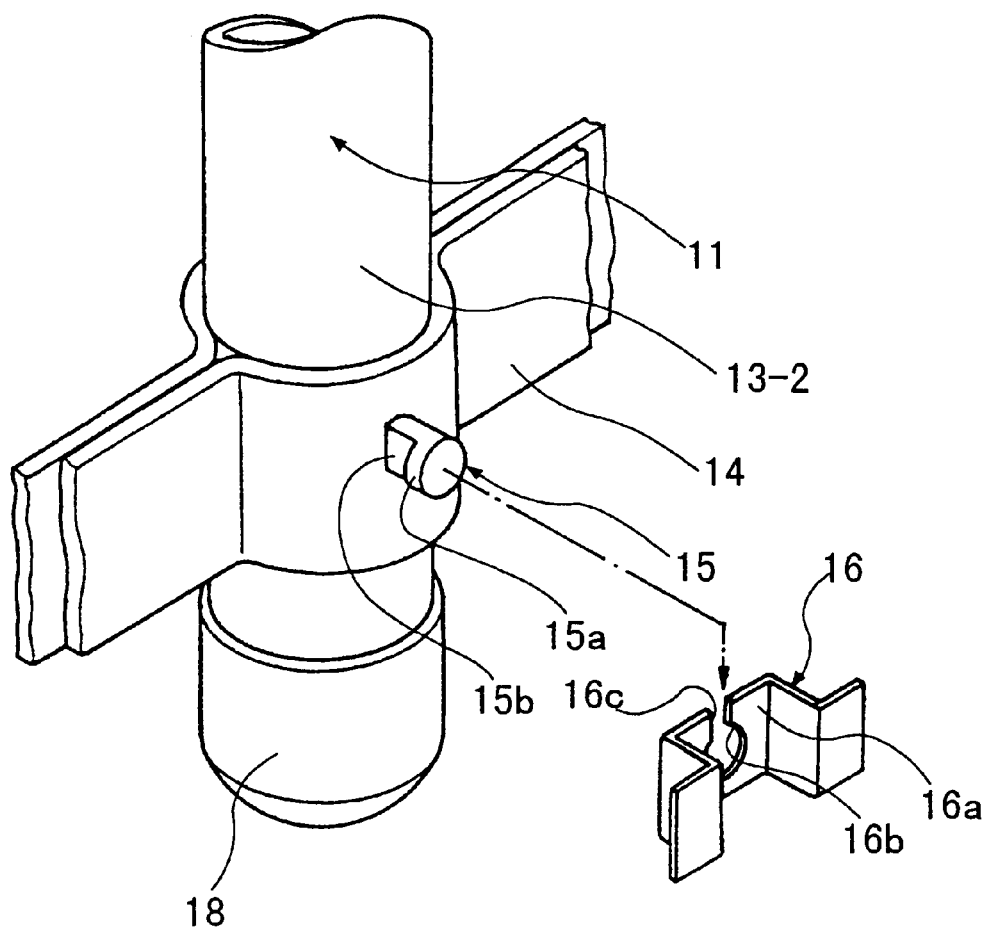
FIG. 2 is a view for explaining a rotating axis and a supporting bracket for supporting the rotating axis according to the invention.

On the end sides of both the sidewall portions 11, a pair of rotating axes 15 supporting rotatably and longitudinally the structure 10 by a rear portion of bed 1B. FIG. 2 is a view for explaining the rotating axes 15 and a supporting bracket 16 for supporting the rotating axes 15. The rotating axis 15, which comprises synthetic resin material, is provided with a cylinder-shaped body 15a and parallel surfaces 15b which is provided on the base end of the cylinder-shaped body and which is opposite to each other through a center of the axis. The rotating axes 15 each are provided on a combining member 14 attached to both ends of the stick-shaped member 13, and further arranged so as to protrude in the width direction of the truck body with crossing the stick-shaped member 13-2 at right angle.

The supporting bracket 16, which is formed from sheet metal, has approximately a section shape of a hat, and is attached to a predetermined position of a sidewall inner panel 3A corresponding to each of the rear of the sidewalls 3. A hole 16b for axis inserted by the rotating axis 15 is perforated on a flat board part 16a of the supporting bracket 16, and further a slit 16c having a width insertable into the parallel surfaces 15b of the rotating axis 15 is provided from the hole 16 for axis to the upper end of the flat board part 16a.

With keeping the attitude of the raised structure 10, i.e., the attitude that the structure 10 is arranged such that the front wall portion 12 is directed upward and the ends of sidewall portions 11 directed downward, the structure 10 is moved such that both the rotating axes 15 each are arranged on the upper side of each of the supporting brackets, whereby the whole structure 10 is moved downward to insert the rotating axes 15 into axes holes 16b. Hence, the structure 10 can be supported rotatably in the longitudinal direction on the rear portion 1B of the bed.

Further, in case the structure 10 is arranged on the first upper side of the tailgate 4 lowered by rearward rotation or on the second upper side of the floor 7 by frontward rotation, the shape of the parallel surface 15b does not coincide with that of the slit 16c. Therefore, the movement of the rotating axis 15 from the axis hole 16b to upward can be restricted to firmly support the structure 10 on the rear portion 1B of the bed 1.

In case the structure 10 is arranged on the second upper side of the floor 7 of the bed, the structure 10 can be also used as a separator for dividing the bed 1 in the longitudinal direction of the body. Further, in this condition, the tailgate 4 can be closed. Hence, in case a size of the bed 1 having extending rearwardly is returned to the original size, the structure 10 is not needed to be removed from the bed 1 whereby work returning the size of the bed 1 to the original size can be easily carried out.

A cap 18 comprising an elastic material is attached to an end of each of the sidewall portions 11. When the tailgate 4 is closed, the cap 18 is in contact with a panel inner 4a of the tailgate 4, whereby the structure 10 is fixed to suppress shake generated during running (see FIG. 6).

The structure 10 has fixing means 20 that the structure 10 is fixed onto the tailgate 4 when the bed 1 extends to rearward of the body, and the structure 10 is fixed onto the bed 1 when the structure is housed in bed 1.

Figure 3:
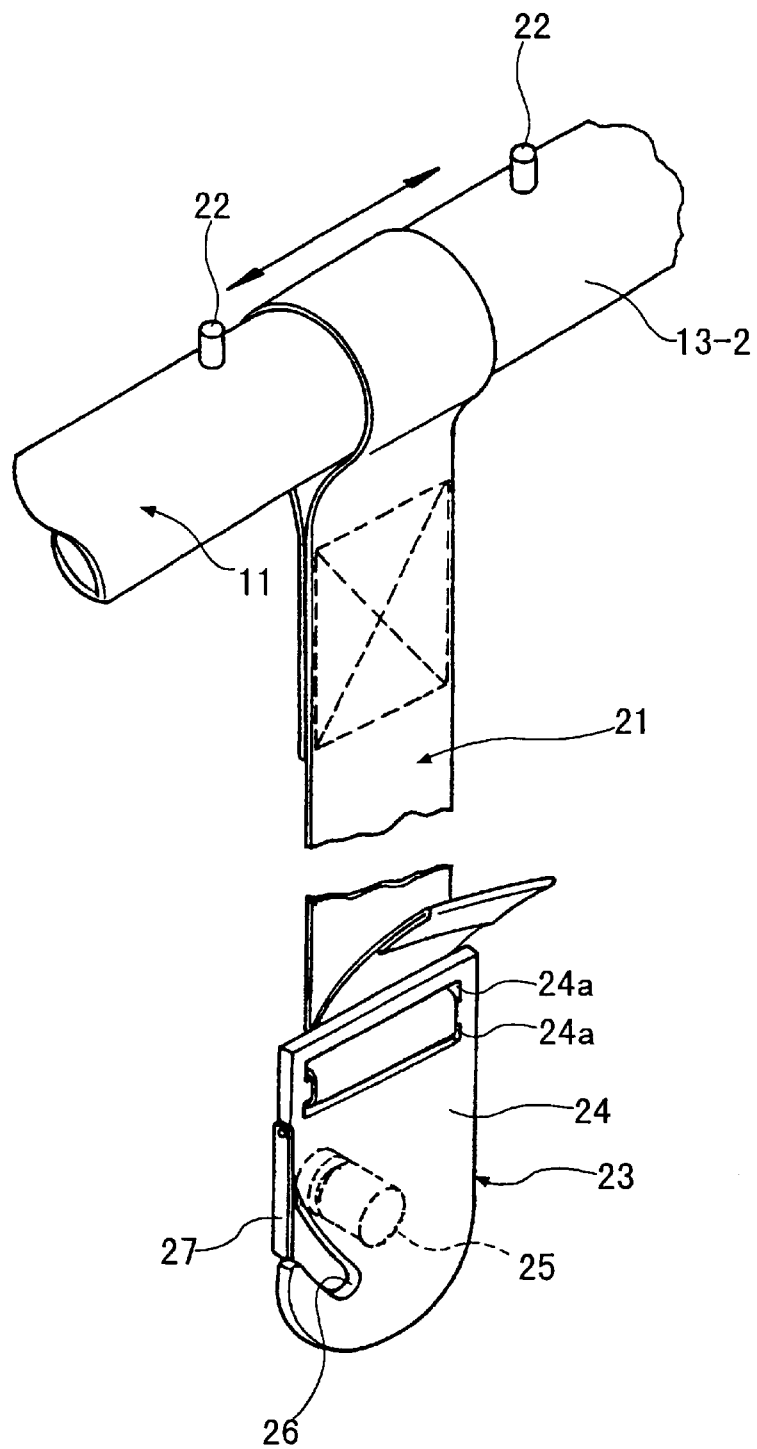
FIG. 3 is a view for explaining fixing means, which is shown by magnifying "P" of FIG. 1.
Figure 4:
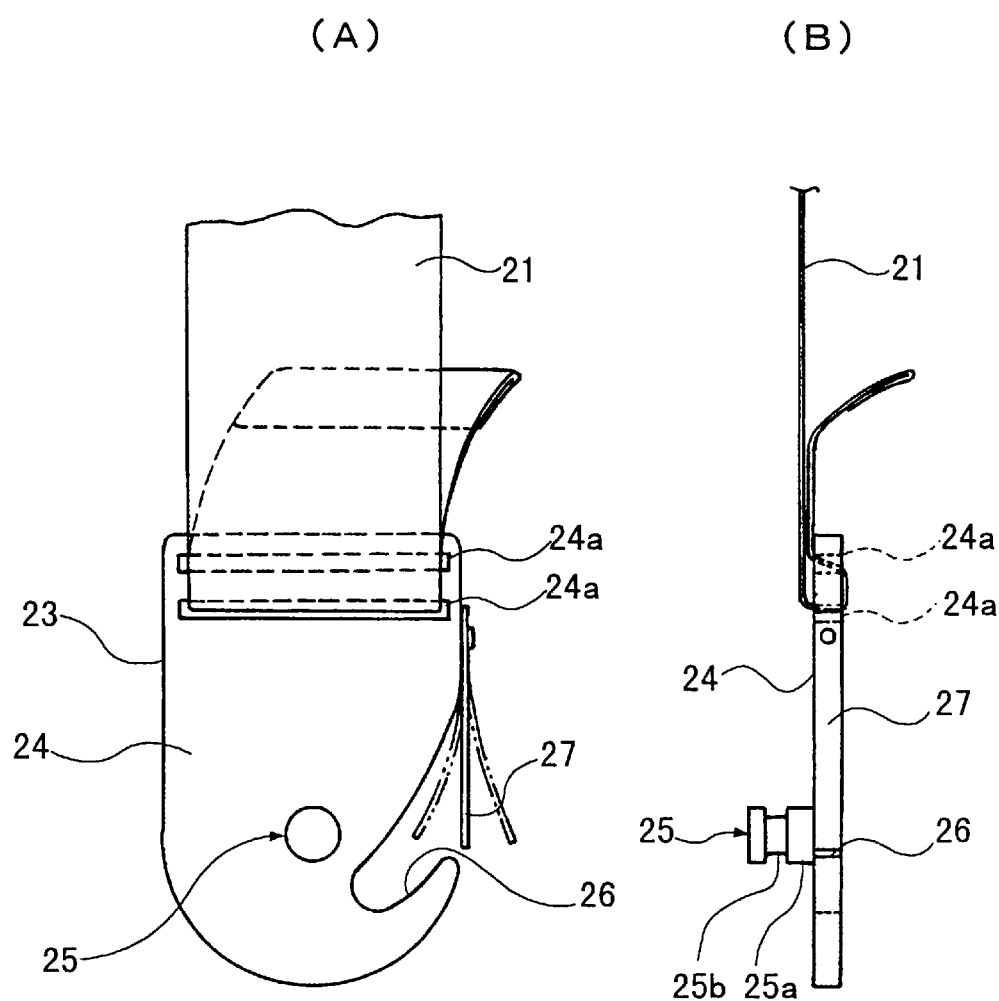
FIG. 4 is a view for explaining a feature of the fixing means according to the invention.

FIG. 3 is a view for explaining fixing means, which is shown by magnifying "P" portion of FIG. 1, while FIG. 4 is a view for explaining an important portion of the fixing means 20. As shown in FIG. 3, the fixing means 20 has a fixing belt 21 comprising synthetic fiber material having a predetermined strength and a fixing metal fitting 23 comprising metal material provided on the end of the fixing belt 21, and the base end of each of the fixing belt 21 is supported on a stick-shaped member 13-2 in each of both the sidewall portions 11.

The fixing belt 21 is attached to the stick-shaped member 13 by winding and returning the base end of the fixing belt 21 around the member 13 to seam the base end with the fixing belt itself. Further, the fixing belt 21 is arranged between two stopper bolts 22 protruded on the stick-shaped member 13-2, and a movement of the fixing belt 21 in the longitudinal direction of the stick-shaped member 13-2 is restricted. The two stopper bolts 22 is attached to such a position that the fixing belt 21 is located on approximately upper side of the latch 8 when the structure 10 is arranged on the first upper side of the tailgate 4 lowered.

In the above embodiment, the base end of the fixing belt 21 is seamed and therefore cannot be removed from the stick-shaped member 13. In other embodiment, it is also possible to adopt a structure rendering the fixing belt 12 removable by using buttons instead of seaming, or a structure hooking the fixing belt 12 on the member 13 by attaching a hook-shaped member (capable of hooking) to the fixing belt 12. By rendering the fixing belt 21 removable, the removed fixing belt can be used as an ordinary cargo belt for fixing baggage.

A front view of a fixing metal fitting 23 is shown in FIG. 4(A), and its side view is shown in FIG. 4(B). As apparent in FIGS. (A) and (B), the fixing metal fitting 23 is provided with a flat plate 24 having a predetermined thickness, an engagement pin (engagement part) 25 protruded from the plate 24 and a hook part 26 formed in the form of notch on the plate 24. A one end of plate 24 is in the form of half circle and the other end is in the form of rectangle. On the other end, a hole 24a for inserting the belt 21 is provided. In this embodiment, two holes 24a for inserting the belt 21 are provided in parallel to each other at predetermined intervals, and the fixing belt 21 is inserted into the hole so as to permit adjusting a length of the belt 21. The engagement pin 25 has a cylindrical body 25a and a part 25b having a small diameter capable of engaging the latch 8 of the tailgate 4, and is attached onto one end of the plate 24. The hook part 26 has a shape capable of hooking the hook part 26 on a receiving fitting 6 in the form of "U" on the bed 1, and a stopper 27 for preventing the hook part from getting out of the receiving fitting 6. The stopper 27 is made up of material that can hook the hook part 26 to the receiving fitting 6 in the form of "U" by curving the stopper 27 and can remove the stopper 27 from the receiving fitting 6. The stopper 27 is a plate spring in this embodiment.

Figure 5:
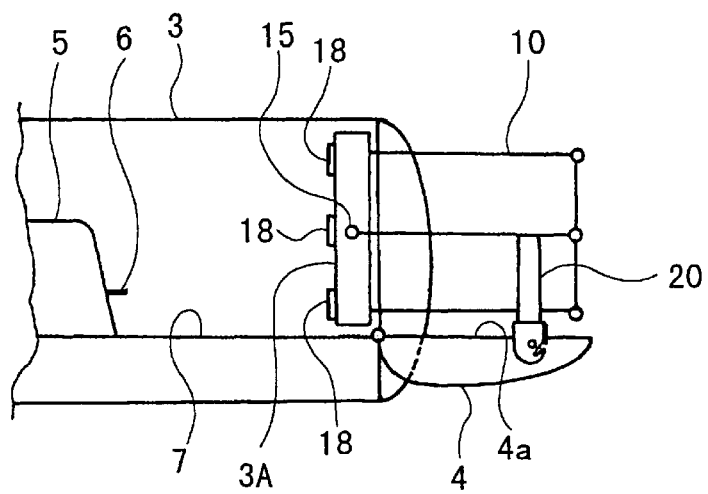
FIG. 5 is a principal view showing the bed extending rearwardly using the structure of the invention.
Figure 6:
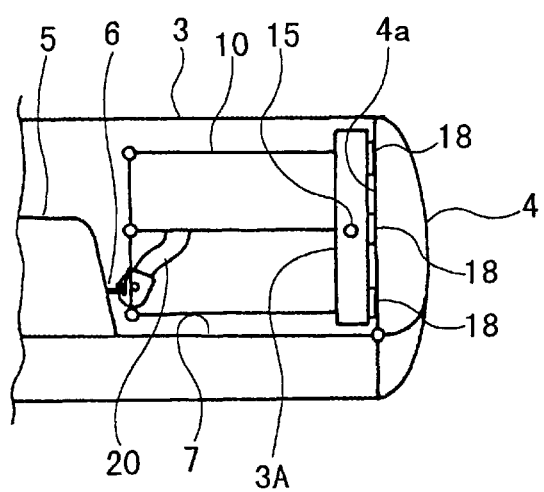
FIG. 6 is a principal view showing the condition that the structure is housed in the bed according to the invention.
Figure 7:
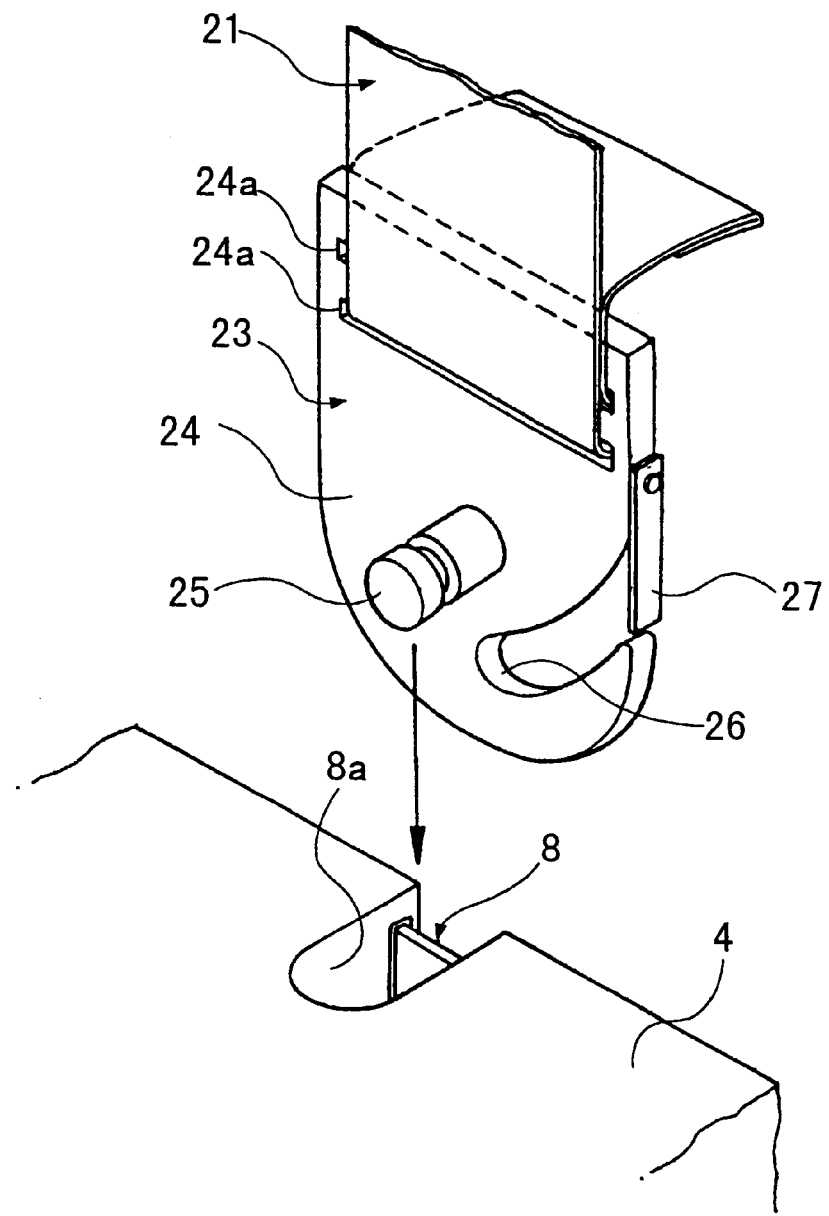
FIG. 7 is a view for explaining a process for engaging a fixing metal fitting with a latch according to the invention.
Figure 8:
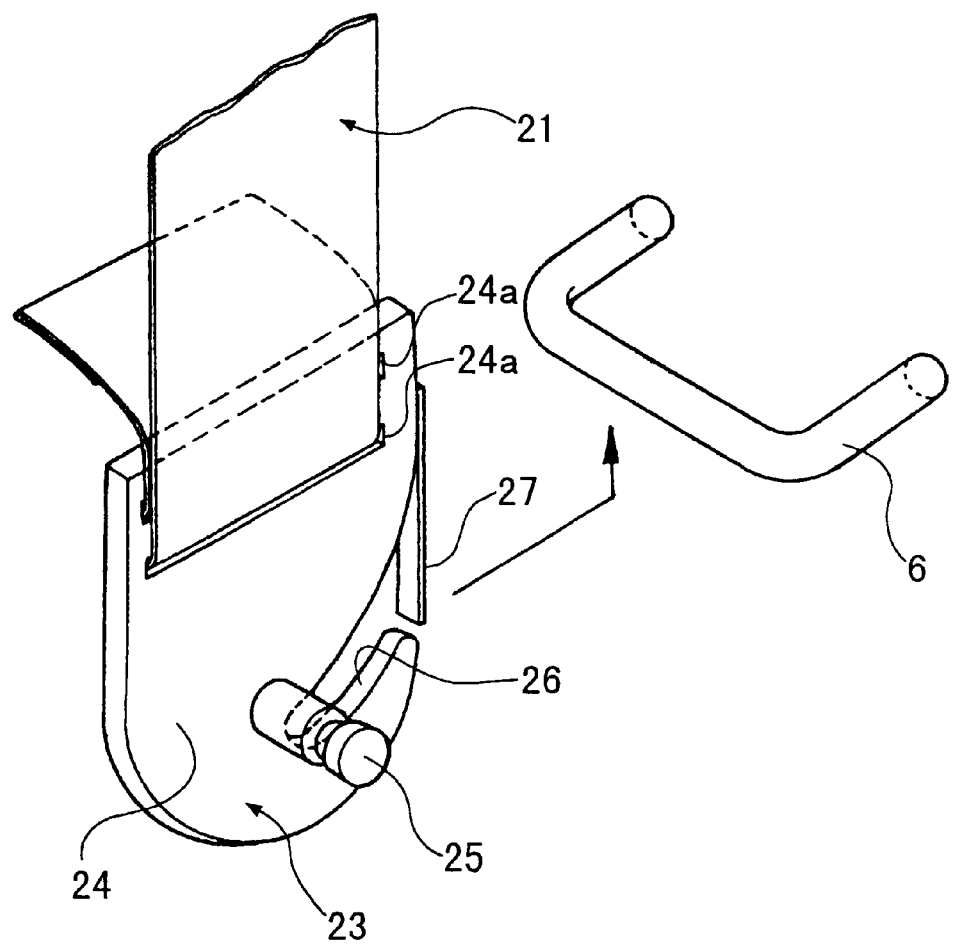
FIG. 8 is a view for explaining a process for engaging a fixing metal fitting with a receiving fitting in the form of "U" according to the invention.

Subsequently, use of the fixing means 20 having the above-mentioned construction is explained below by reference of FIGS. 5 to 8. FIG. 5 is a principal view showing the bed 1 extending rearwardly using the structure 10 for extending a bed, FIG. 6 is a principal view showing the structure 10 housed in the bed 1, FIG. 7 is a view for explaining an engaging process of engaging the fixing metal fitting 23 with the latch 8. FIG. 8 is a view for explaining an engaging process of engaging the fixing metal fitting 23 with the receiving fitting 6 in the form of "U".

In case the bed 1 extends backward, the structure 10 is first rotated backward, and arranged on the first upper side of the tailgate 4 lowered horizontally as shown in FIG. 5. Thus, the sidewall portions 11 are extended along the both sides of tailgate 4 from the rear end of the sidewall 3 to backward of the body of the truck, and the front wall portion 12 extends along the rear end of the tailgate 4 in the direction of the width of the body. Hence, the bed 1 extends rearwardly to convert the first upper side of the tailgate 4 to a part of the floor of the bed.

In the above case, the fixing belt 21 is arranged approximately on an upper side of the latch 8 in hanging condition. As shown in FIG. 7, the engagement pin 25 of the fixing metal fitting 23 is inserted into a latch groove 8a in the direction shown in the arrow, and the fixing metal fitting 23 is engaged with the latch 8. Then, the end of the fixing belt 21 is raised to adjust reductively a length of the fixing belt 21. Further, the opposite fixing means 20 is also subjected to the same work as above. Thus, the structure 10 can be fixed on the tailgate 4. Hence, the structure 10 can be prevented from shaking on the first upper side of tailgate 4 while the truck is running, whereby generation of noise can be prevented.

On the other hand, in order that the structure 10 is housed in the bed 1, means (not shown) for taking off the latch 8 is operated to take off the engagement of the latch with the fixing metal fitting 23 and to move rotatably the structure 10 frontward, whereby the structure 10 is arranged on the second upper side of the floor 7 of the bed 1 as shown in FIG. 6. Then, the fixing belt 21 is rotated in a 180-degree arc on a base end part in the opposite direction to be hanged. Further, as shown in FIG. 8, the hook part 26 of the fixing metal fitting 23 is hooked on the receiving fitting 6 in the form of "U" in the direction of the arrow in FIG. 8, and the end of the fixing belt 21 is raised to adjust reductively a length of the fixing belt 21. In this case, movement of the fixing belt 21 is restricted by two stopper bolts 22, and therefore the range for adjusting length of the belt 21 can be reduced to facilitate the adjusting work.

Further, the same work as above is also carried out for the opposite fixing means 20. Thus, the structure 10 can be fixed onto the bed 1. Subsequently, the tailgate 4 is raised to close the rear portion 1B of the bed, whereby the structure 10 can be completely housed in the bed.

In the structure 10 for extending the bed 1 having the above-mentioned construction, the structure 10 can be fixed onto the bed 1 when the structure 10 is housed in the bed 1. Hence, for instance, the structure 10 can be fixed onto the bed 1 not to have a secondary influence on surroundings if the rotating axis 15 is separated from the part for supporting bracket 16 by applying an impact load to the rear portion 1B of the body.

Further, both of the engagement pin 25 and the hook part 26 are provided on the fixing metal fitting 23 corresponding to the fixing means 20, and therefore the fixing belt 21 can be employed for common use. In more detail, the structure 10 can be fixed onto not only the bed 1 but also the tailgate 4 without separately providing an exclusive fixing belt on each of the bed 1 and the tailgate 4. Hence, the number of members can be reduced and the construction of the structure can be made simple to reduce cost.

Figure 9:
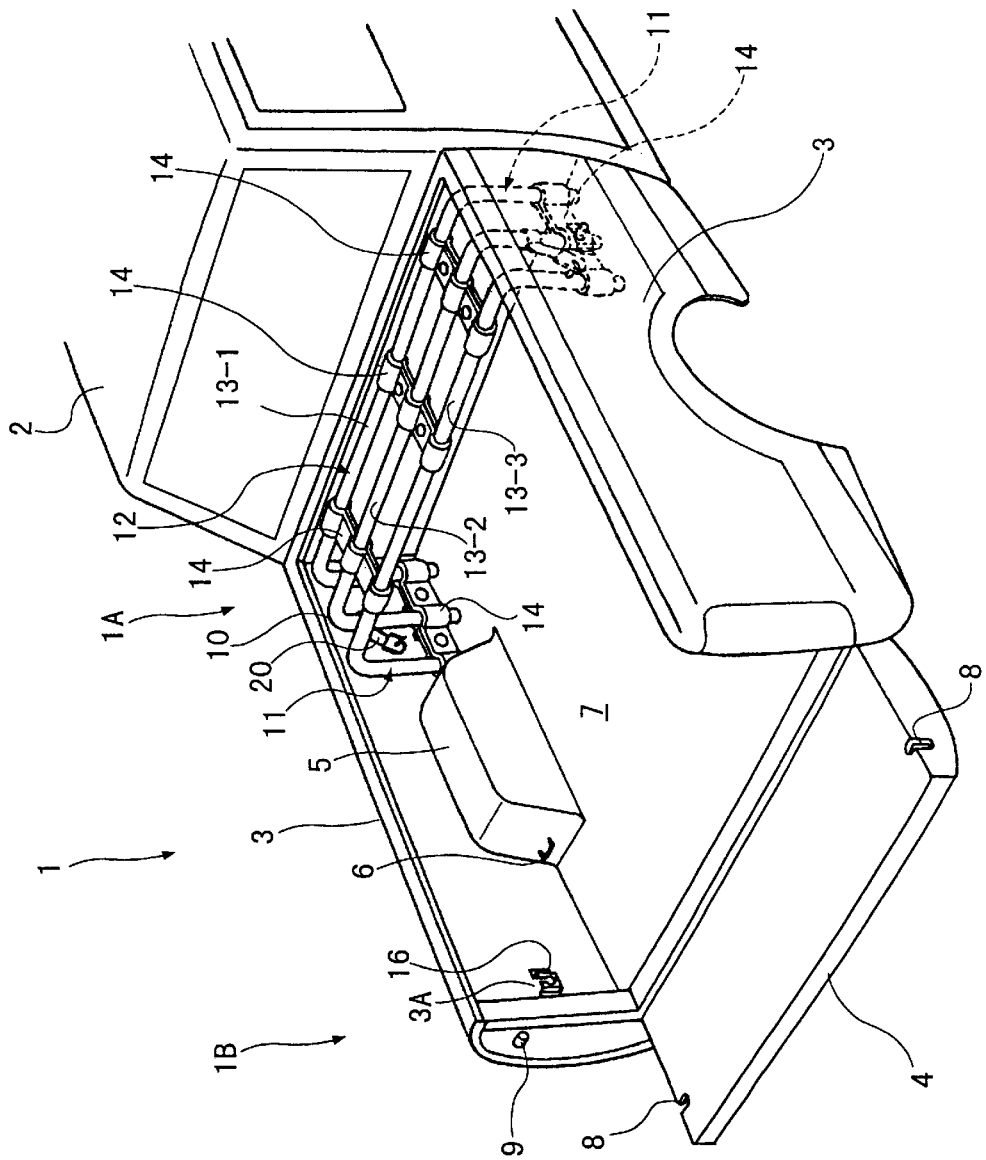
FIG. 9 is a view showing the condition that the structure is arranged and fixed onto the front portion of the bed according to the invention.
Figure 10:
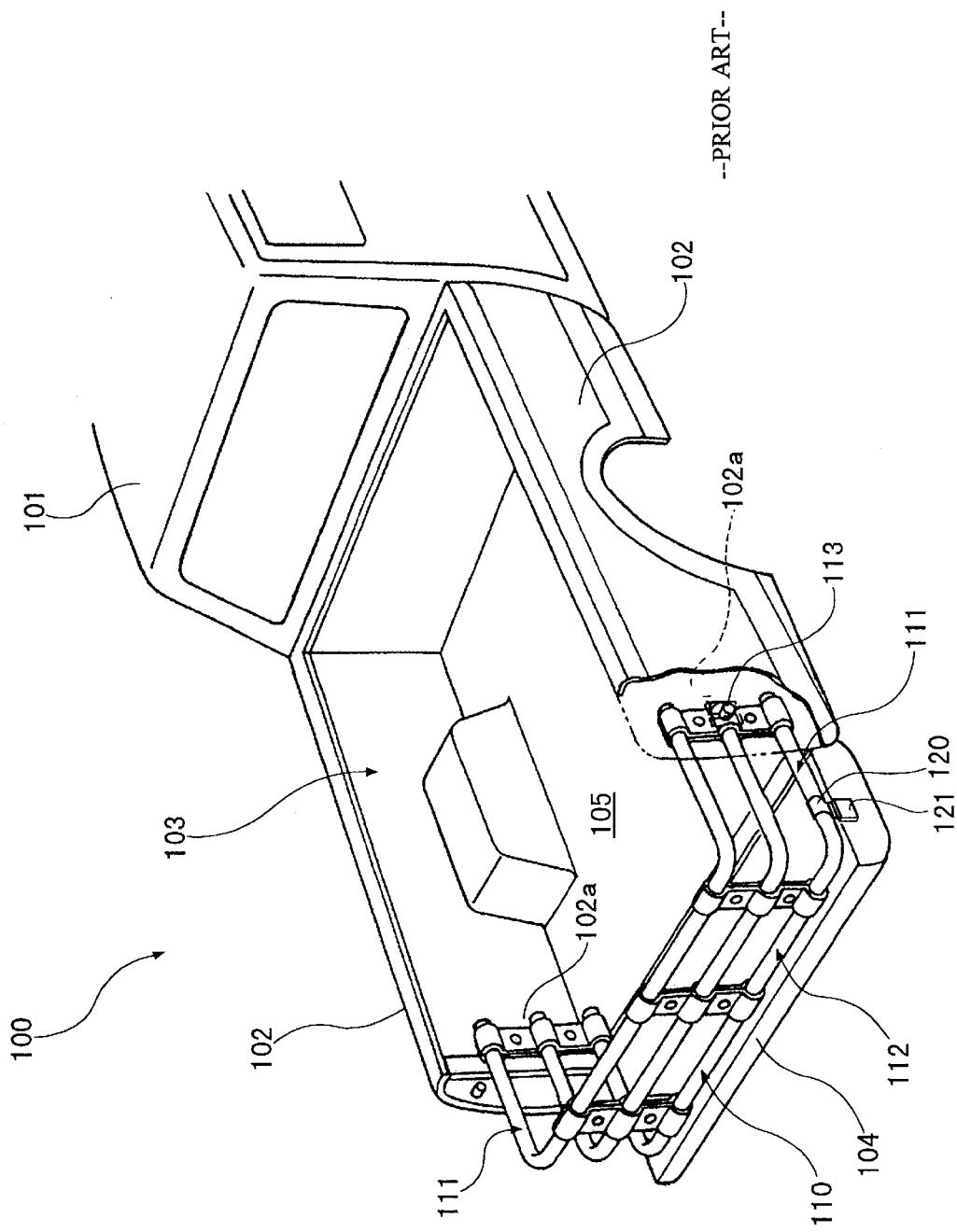
FIG. 10 is a view for explaining a conventional structure for extending a bed.
Figure 11:
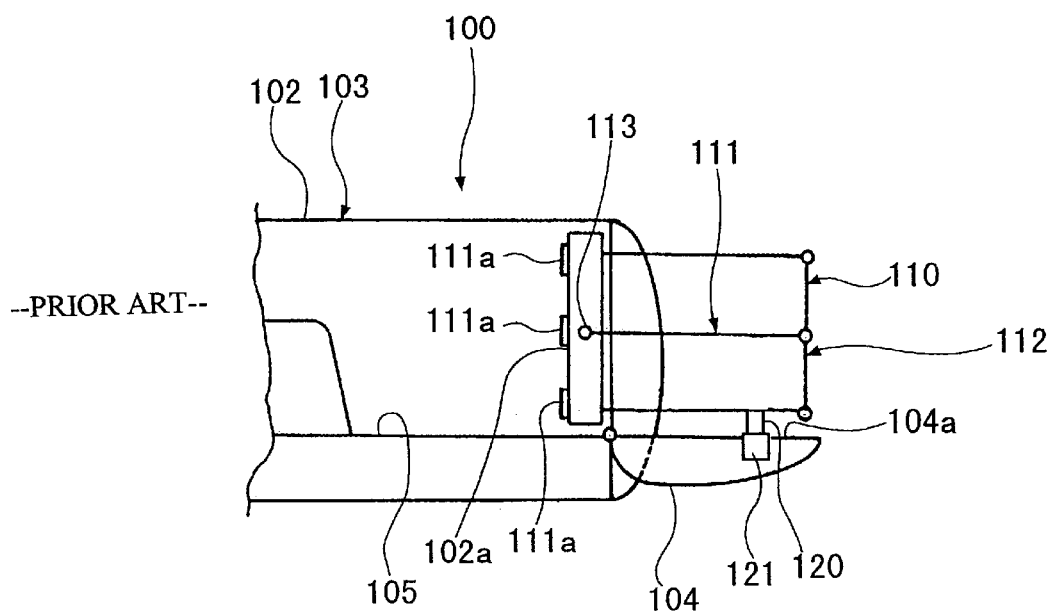
FIG. 11 is a view showing the condition that the bed extends rearwardly.
Figure 12:
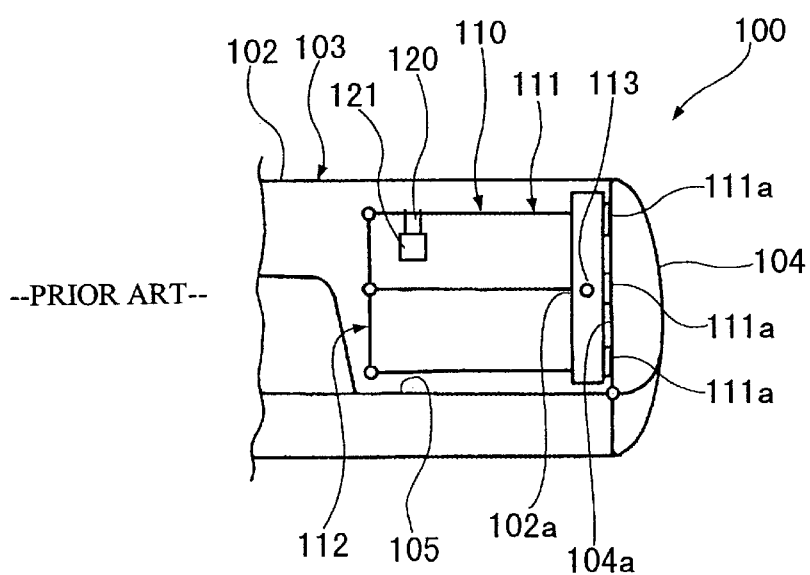
FIG. 12 is a view showing the condition that the structure is housed in the bed.

Further, it is also possible to remove the structure 10 from the rear portion 1B of the bed 1 by using the fixing means 20 having the above construction to arrange and fix onto the front portion 1A of the bed 1. FIG. 9 is a view showing the structure arranged and fixed onto the front portion 1A of the bed 1. As shown in FIG. 9, the structure 10 is placed on the floor 7 of the bed 1 in the raised attitude, and fixed by hooking the hook part 26 of the fixing metal fitting 23 onto the receiving fitting 6 in the form of "U" (not shown) attached to the panel inner 3A of the sidewall 3. Hence, a space whose upper side is blockaded by the front wall portion 12 of the structure 10 can be formed on the front portion 1A of the bed 1 to permit extension of use of the bed 1.

Moreover, the present invention should not be restricted by the above-mentioned embodiments, and the invention can be varied in the constitution so long as the variation is not deviated form the gist of the invention. Though the embodiment of the invention shows the latch 8 having a structure capable of engaging a stick-shaped striker 9, for example, it is possible that the latch 8 has a structure capable of engaging a "U"-shaped striker and in this case the fixing means has a "U"-shaped engaging pin.

(Effect of the Invention)

As apparent from the above description, according to the invention, the fixing means for fixing the structure for extending a bed to the bed when the structure is housed in the bed is provided, and hence if impact load is applied to the body of a truck and the structure is off the part for supporting it on the bed, the structure can be fixed onto the bed not to have a secondary influence on surroundings.

The disclosure of Japanese Patent Application No. 2001-393705, dated Dec. 26, 2001, including the specification, drawings and abstract, is hereby incorporated by reference in its entirety.

While the presently preferred embodiments of the present invention have been shown and described, it is to be understood that disclosures are for the purpose of illustration and that various changes and modification may be made without departing from the scope of the invention as set forth in the appended claims.

We claim:

1. A structure for extending a bed of a pickup truck including a floor, a pair of side walls extending longitudinally along both edge sides of the floor, and a tailgate configured to be lowered in succession to a rear end of the floor and approximate level with the rear end by tilting the tailgate, comprising:

the structure being provided on a first upper side of the tailgate to extend the bed rearwardly when the tailgate is lowered by rotation in a rear direction of the truck; and the structure being provided on a second upper side of the floor to be housed in the bed when the tailgate is rotated in a forward direction of the truck;

wherein the sidewalls include a wheelhouse with a receiving fitting on the rear portion of the wheelhouse, and wherein fixing means is provided on the structure for fixing the structure arranged on the second upper side of the floor onto the bed and is capable of being fixed to the receiving fitting on the rear portion of the wheelhouse when the tailgate is rotated in a forward direction of the truck.

2. A structure for extending a bed of a pickup truck including a floor, a pair of side walls extending longitudinally along both edge sides of the floor, and a tailgate configured to be lowered in succession to a rear end of the floor and approximate level with the rear end by tilting the tailgate, comprising:

the structure extending from the rear end of the sidewalls to rearward of a body along both sides of the tailgate and extending in the width direction of the truck along the rear end of the tailgate whereby the floor of the bed extends rearward to convert a first upper side of the tailgate to a part of the floor, when the tailgate is lowered by rotation in a rear direction of the truck; and the structure being provided on a second upper side of the floor to be housed in the bed when the tailgate is rotated in a forward direction of the truck;

wherein the sidewalls include a wheelhouse with a receiving fitting on the rear portion of the wheelhouse, and wherein fixing means is provided on the structure for fixing the structure arranged on the second upper side of the floor onto the bed and is capable of being fixed to the receiving fitting on the rear portion of the wheelhouse when the tailgate is rotated in a forward direction of the truck.

3. The structure as defined in claim 1 or 2, wherein the fixing means permits fixing the structure arranged on the lowered tailgate onto the tailgate.

4. The structure as defined in claim 1 or 2, wherein the fixing means has a fixing belt with base end attached to the structure and having an adjustable length, and a hook part provided on the end of the fixing belt and capable of engaging an anchor attached to the bed.

5. The structure as defined in claim 4, wherein the tailgate has a latch configured to be hooked on the rear ends of the sidewalls when the tailgate is rotated in a forward direction to be raised, and the fixing means is provided on the end of the fixing belt and is provided with an engagement part capable of engaging the latch of the lowered tailgate, the structure being fixed to the tailgate by engaging the engagement part to the latch of the lowered tailgate.

6. The structure as defined in claim 5, wherein the structure is provided with plural stick-shaped members bent in the form of "U" along a periphery of the first upper side of the lowered tailgate and combining members connecting these stick-shaped members to one another at vertical parallel intervals, and the fixing belt is movably supported in axial direction of the plural stick-shaped members by any of the plural stick-shaped members.

7. The structure as defined in claim 6, wherein the fixing belt is removably attached to the stick-shaped members.

8. The structure as defined in claim 6, wherein the stick-shaped members have control means controlling a movement of the fixing belt in a defined range.

9. The structure as defined in claim 7, wherein the stick-shaped members have control means controlling movement of the fixing belt in a defined range.

10. The structure as defined in claim 3, wherein the fixing means has a fixing belt with a base end attached to the structure and having an adjustable length, and a hook part provided on the end of the fixing belt and capable of engaging an anchor attached to the bed.

11. The structure as defined in claim 10, wherein the tailgate has a latch configured to be hooked on the rear ends of the sidewalls when the tailgate is rotated in a forward direction to be raised, and the fixing means is provided on the end of the fixing belt and is provided with an engagement part capable of engaging the latch of the lowered tailgate, the structure being fixed to the tailgate by engaging the engagement part to the latch of the lowered tailgate.

12. The structure as defined in claim 11, wherein the structure is provided with plural stick-shaped members bent in the form of "U" along a periphery of the first upper side of the lowered tailgate and combining members connecting these stick-shaped members to one another at vertical parallel intervals, and the fixing belt is movably supported in axial direction of the plural stick-shaped members by any of the plural stick-shaped members.

13. The structure as defined in claim 12, wherein the fixing belt is removably attached to the stick-shaped members.

14. The structure as defined in claim 12, wherein the stick-shaped members have control means controlling a movement of the fixing belt in a defined range.

15. The structure as defined in claim 13, wherein the stick-shaped members have control means controlling a movement of the fixing belt in a defined range.

16. A structure for extending a bed of a pickup truck including a floor, a pair of sidewalls extending longitudinally along both edge sides of the floor, and a tailgate configured to be lowered in succession to a rear end of the floor and approximate level with the rear end by tilting the tailgate, comprising:

the structure being provided on a first upper side of the tailgate to extend the bed rearwardly when the tailgate is lowered by rotation in a rear direction of the truck; and the structure being provided on a second upper side of the floor to be housed in the bed when the tailgate is rotated in a forward direction of the truck;

wherein the sidewalls include a wheelhouse with a receiving fitting on the rear portion of the wheelhouse, and wherein fixing means is provided on the structure for fixing the structure arranged on the second upper side of the floor onto the bed and is capable of being fixed to the receiving fitting on the rear portion of the wheelhouse when the tailgate is rotated in a forward direction of the truck; and wherein the tailgate has a latch configured to be hooked on the rear portion of the sidewalls when the tailgate is rotated in a forward direction to be raised and the fixing means is provided with an engagement part capable of engaging the latch of the lowered tailgate.

17. The structure as defined in claim 16, wherein the fixing means permits fixing the structure arranged on the lowered tailgate onto the tailgate.

18. The structure as defined in claim 16, wherein the fixing means has a fixing belt with base end attached to the structure and having an adjustable length, and a hook part provided on the end of the fixing belt and capable of engaging an anchor attached to the bed.

19. The structure as defined in claim 16, wherein the structure is fixed to the tailgate by engaging the engagement part to the latch of the lowered tailgate.

20. The structure as defined in claim 16, wherein the structure is provided with plural stick-shaped members bent in the form of "U" along a periphery of the first upper side of the lowered tailgate and combining members connecting these stick-shaped members to one another at vertical parallel intervals, and the fixing belt is movably supported in axial direction of the plural stick-shaped members by any of the plural stick-shaped members.

21. A structure for extending a bed of a pickup truck including a floor, a pair of side walls extending longitudinally along both edge sides of the floor, and a tailgate configured to be lowered in succession to a rear end of the floor and approximate level with the rear end by tilting the tailgate, comprising:

the structure being provided on a first upper side of the tailgate to extend the bed rearwardly when the tailgate is lowered by rotation in a rear direction of the truck; and the structure being provided on a second upper side of the floor to be housed in the bed when the tailgate is rotated in a forward direction of the truck;

wherein fixing means is provided for fixing the structure arranged on the second upper side of the floor onto the bed;

wherein the fixing means has a fixing belt with base end attached to the structure and having an adjustable length, and a hook part provided on the end of the fixing belt and capable of engaging an anchor attached to the bed;

wherein the tailgate has a latch configured to be hooked on the rear ends of the sidewalls when the tailgate is rotated in a forward direction to be raised, and the fixing means is provided on the end of the fixing belt and is provided with an engagement part capable of engaging the latch of the lowered tailgate, the structure being fixed to the tailgate by engaging the engagement part to the latch of the lowered tailgate.

22. The structure as defined in claim 21, wherein the structure is provided with plural stick-shaped members bent in the form of "U" along a periphery of the first upper side of the lowered tailgate and combining members connecting these stick-shaped members to one another at vertical parallel intervals, and the fixing belt is movably supported in axial direction of the plural stick-shaped members by any of the plural stick-shaped members.

23. The structure as defined in claim 21, wherein the fixing belt is removably attached to the stick-shaped members.

24. The structure as defined in claim 21, wherein the stick-shaped members have control means controlling a movement of the fixing belt in a defined range.

25. The structure as defined in claim 23, wherein the stick-shaped members have control means controlling movement of the fixing belt in a defined range.

* * * * *